J. BARRETT.
Assignor to the DUFF MANUFACTURING COMPANY, Limited.
LIFTING JACK.
No. 10,574.
Reissued Mar. 24, 1885.
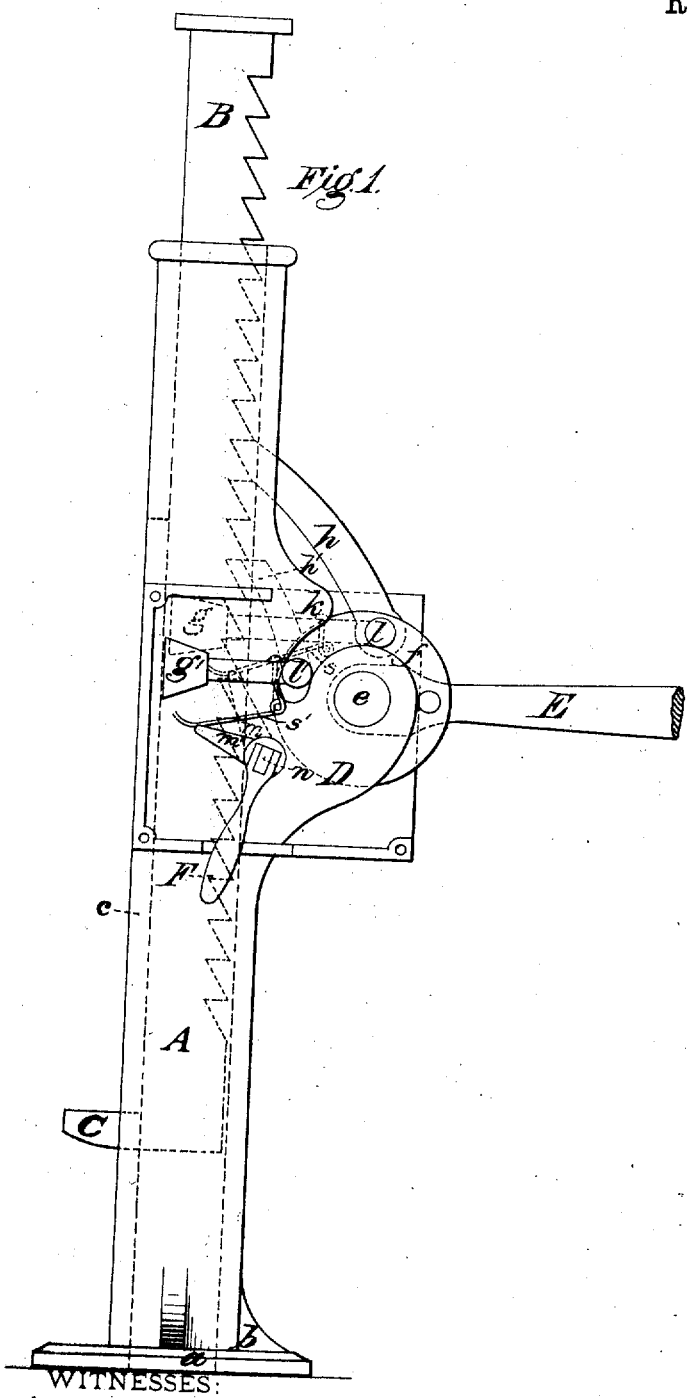
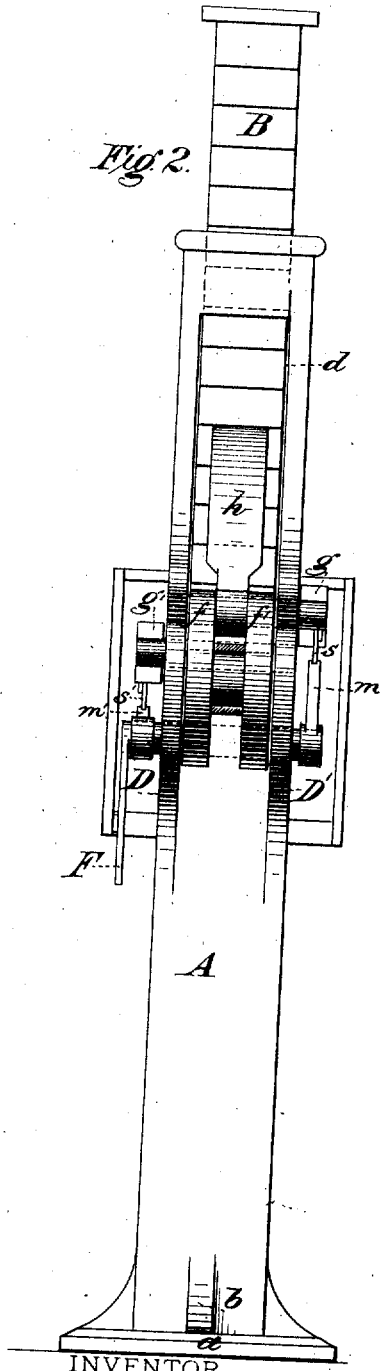
WITNESSES:
Darwin S. Wolcott
C. M. Clarke
INVENTOR
Josiah Barrett.
BY George H. Christy
ATTORNEY.

UNITED STATES PATENT OFFICE.

JOSIAH BARRETT, OF ALLEGHENY, PENNSYLVANIA, ASSIGNOR TO THE DUFF MANUFACTURING COMPANY, (LIMITED.)

LIFTING-JACK.

SPECIFICATION forming part of Reissued Letters Patent No. 10,574, dated March 24, 1885.

Original No. 293,400, dated February 12, 1884. Application for reissue filed January 27, 1885.

*To all whom it may concern:*

Be it known that I, JOSIAH BARRETT, a citizen of the United States, residing at Allegheny, in the county of Allegheny and State of Pennsylvania, have invented or discovered certain new and useful Improvements in Lifting-Jacks, of which improvements the following is a specification.

In the accompanying drawings, which make part of this specification, Figure 1 is a side elevation of my improved jack, showing its working mechanism. Fig. 2 is a front elevation.

My invention relates to an improvement in that class of lifting-jacks in which the lifting-bar is raised by the operation of a lever carrying a pawl which engages with teeth formed along one side or edge of the lifting-bar; and the object of my invention is to provide for a continuous movement of the bar either up or down; and to this end my invention consists in the construction and combination of parts, all as more fully hereinafter described and claimed.

The box or standard A is made square or rectangular in cross-section, with a similarly-shaped passage therethrough, and is firmly supported on the foot *a* by braces *b*. In the rear side of the box or standard is formed an opening or slot, *c*, extending to nearly two-thirds of its height from the foot upward, and in its front side is formed an opening or slot, *d*, extending downward from near the top for nearly half the length of the standard. Within the standard is placed the lifting-bar B, having ratchet-teeth formed on its front side, and provided at its lower and the side opposite the ratchet-teeth with the foot C, said foot projecting out through the slot *c* and moving with the lifting-bar. On the standard A, near the lower end of the slot *d*, are formed the brackets D D′, forming between them a recess in which is pivoted the operating handle or lever E, the pivot-pin *e* of said lever being journaled in the brackets, as shown. On each side of the pivotal end of the lever are secured the disks *f f′*, which turn back and forth as the handle or lever is moved up and down. In suitable holes in the disks *f f′* are journaled the shafts or spindles *l l′*, formed on the lower end of the pawls *h h′*. These shafts or spindles are so constructed that one end of each shaft or spindle will project beyond the brackets D D′, as shown in Fig. 2, which are provided with curved slots *k*, to permit of the movement of the shafts. The openings in the disks *f f′*, in which the shafts *l l′* are journaled, are located on different sides of a vertical plane passing through the axes of the pivot-pin *e* of the handle or lever E, and are separated a distance equal to that between two teeth on the lifting-bar. The pawls *h* and *h′* are constructed and arranged to engage the teeth of the lifting-bar one above the other, and are held in such engagement by the weighted levers *g* and *g′*, secured to the projecting portions of the shafts or spindles *l l′*, outside of the brackets D D′. As the lever or handle is raised the outer pawl, *h*, engages a tooth on the lifting-bar, thereby causing an upward movement of the lifting-bar, this upward movement of the lifting-bar being equal to about one-half the distance between two teeth. As the outer pawl is raised the inner pawl, *h′*, is correspondingly lowered, such downward movement being also equal to about one-half the distance between two teeth on the lifting-bar. By reversing the movement of the lever E the inner pawl and lifting-bar are raised and the outer pawl is lowered, the amount of such upward and downward movements of the parts being the same as above stated. The springs *s s′*, having two arms, as shown, are arranged outside the brackets, one arm of each spring being secured in any suitable manner to the weighted levers *g g′* of the pawls, and the other arm of each spring being arranged for engagement with the crank-arms *m*, secured to the shaft *n*, journaled in the brackets D D′, said shaft being provided at one end with a handle, F, whereby the shaft is turned so as to bring the crank-arms *m* in engagement with the springs *s s′*. When it is desired to lower the lifting-bar, the handle F is turned until the crank-arms *m* cause the springs *s s′* to engage the weighted levers *g g′* with considerable tension, the tendency of such tension being to overcome the action of the weighted levers, and consequently to disengage the pawls from the lifting-bar.

In describing the lowering operation I will suppose that the handle or lever E is in the position shown in Fig. 1, and that the inner pawl, *h'*, is held away from the lifting-bar by the spring *s'*; but that the outer pawl, *h*, is in engagement with the lifting-bar. Now, if the handle E be lowered, the outer pawl and lifting-bar will be lowered, such downward movement effecting a considerable compression of the spring *s* as the weighted lever moves down with the pawl, and the weight on the lifting-bar prevents the pawl *h* from being forced outward by the action of the spring. During this downward movement of the handle and the outer pawl the inner pawl is moved up, being held away from the lifting-bar by the spring *s'* until near the upper limit of its movement, at which point the spring will have reached the limit of its expansion, and will permit the weighted lever to throw the pawl into engagement with the lifting-bar, so that as the handle E completes its downward movement the inner pawl will slightly raise the lifting-bar, thereby freeing the outer pawl from the weight of the lifting-bar, and enabling the spring *s* to throw said pawl away from the lifting-bar. As the handle E is raised the above operation is repeated, the lifting-bar being lowered by the inner pawl, the downward movement of said pawl compressing its spring *s'*, and the outer pawl being held away from the lifting-bar by its spring *s* until the handle approaches the upper limit of its stroke, when the outer engages and lifts the lifting-bar so as to free the inner pawl. In this manner a continuous uninterrupted lowering movement of the lifting-bar is effected by the up and down movement of the lever E, a similar movement effecting an upward movement when the springs are out of engagement with the weighted levers.

I claim herein as my invention—

1. In a lifting-jack, a lifting-bar provided with ratchet-teeth on one side only, in combination with an operating-lever and two pawls pivoted to said lever in such relation to its fulcrum-point that one of said pawls, arranged to engage the lifting-bar on the same side, one above the other, will engage the lifting-bar during the upward movement of the operating-lever, and the other pawl will engage said lifting-bar during the downward movement of the operating-lever, substantially as set forth.

2. In a lifting-jack, a lifting-bar provided with ratchet-teeth, in combination with an operating-lever, one on each side of its fulcrum-point, and springs adapted to engage said pawls and hold them alternately from engagement with the lifting-bar while they are being raised by the operating-lever, and to permit the pawls to engage said lifting-bar while they are being lowered, such alternate engagement and disengagement being effected automatically, substantially as set forth.

3. In a lifting-jack, the lifting-bar provided with ratchet-teeth, in combination with an operating-lever, and pawls *h h'*, provided with weighted levers *g g'*, and pivoted to the operating-lever, one on each side of its fulcrum-point, substantially as set forth.

4. In a lifting-jack, a lifting-bar provided with ratchet-teeth, in combination with an operating-lever, pawls *h h'*, weighted levers *g g'*, springs *s s'*, crank *m*, and lever F, substantially as set forth.

In testimony whereof I have hereunto set my hand.

JOSIAH BARRETT.

Witnesses:
DARWIN S. WOLCOTT,
R. H. WHITTLESEY.